No. 762,589. PATENTED JUNE 14, 1904.
R. S. LAWRENCE.
APPARATUS FOR USE IN PROPAGATING PLANTS.
APPLICATION FILED AUG. 3, 1903.
NO MODEL.
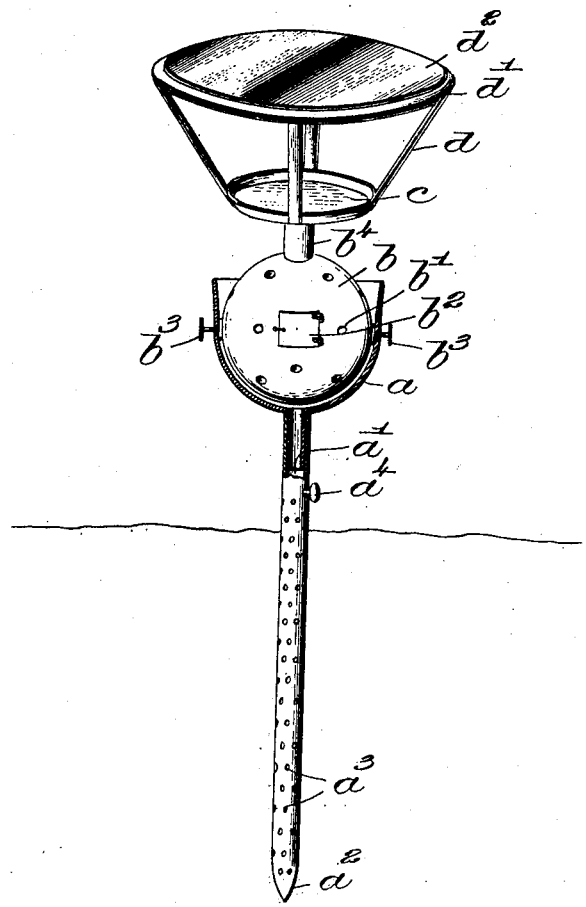

No. 762,589.

Patented June 14, 1904.

UNITED STATES PATENT OFFICE.

ROBERT S. LAWRENCE, OF BOSTON, MASSACHUSETTS, ASSIGNOR TO CONSOLIDATED INVENTORS CORPORATION, OF BOSTON, MASSACHUSETTS, A CORPORATION OF SOUTH DAKOTA.

APPARATUS FOR USE IN PROPAGATING PLANTS.

SPECIFICATION forming part of Letters Patent No. 762,589, dated June 14, 1904.

Application filed August 3, 1903. Serial No. 168,058. (No model.)

*To all whom it may concern:*

Be it known that I, ROBERT S. LAWRENCE, a citizen of the United States, residing at Boston, in the county of Suffolk and State of Massachusetts, have invented an Improvement in Apparatus for Use in Propagating Plants, of which the following description, in connection with the accompanying drawing, is a specification, like letters on the drawing representing like parts.

This invention has for its object the production of a novel apparatus for use in propagating plants and by or through which to administer food and warmth to the roots of growing plants, especially flowers, shrubs, and vegetables, the development of which is receiving the attention of floriculturists.

The careful study of flowers, shrubs, and vegetables leading to their greater development and growth has proven that certain flowers and vegetables require for their growth certain foods that are not always found in the soil, and undoubtedly there are other substances within the range of chemistry that may be cheaply produced and that will be found of great benefit in connection with plant growth.

The apparatus that I am about to more fully describe will make it possible not only to apply to the roots of flowers, shrubs, and vegetables a predetermined quantity of what may be universally acknowledged to be the best food for the particular flowers and vegetables being treated, and also the apparatus may be used with great efficiency under the most favorable auspices for supplying new elements that may be discovered by experiment as tending to greater growth of plants.

In my apparatus I take advantage not only of the artificial stimulants and plant-food, but also of the rays of the sun.

The figure is an elevation, partly in section, of an apparatus embodying my invention.

My novel apparatus in the form which I have herein chosen to illustrate the same—one of the best forms now known to me—comprises a funnel, preferably of brass, in which is adjustably mounted a hollow zinc ball having a neck that sustains a copper dish, the dish in turn sustaining a sun-glass of greater or less power, according to the heat desired for the copper plate and the contents of the ball. The ball has a door in which plant-food of a more or less solid nature may be introduced from time to time, as required. The funnel $a$, of copper, has, as shown, a hollow shank $a'$, preferably pointed at $a^2$ to enter the ground easily and provided with a series of outlets $a^3$, a cock $a^4$ being provided to sustain liquid in the funnel until it is in condition to be discharged into the ground through the holes in the shank, the cock being at such time open for this purpose. Preferably the interior of the funnel will be concaved to form a seat for and surround a part of the preferably circular exterior of the hollow zinc ball $b$, also perforated at $b'$ and having a door $b^2$, through which may be inserted plant-food, the ball having coacting with it suitable screws or devices $b^3$, by which to retain the ball in any desired adjusted position in the funnel, according, it may be, to the position of the sun. The ball has a neck $b^4$, and to the end of the ball is secured a copper dish $c$. The dish has erected upon it arms $d$, that sustain a support $d'$, in which is fitted a sun-glass $d^2$, that may be, say, four inches in diameter and one and one-half inches thick.

The size of the sun-glass and other parts of the apparatus and their relative proportions may be varied to suit the particular occasion without departing from this invention.

The plant-food to be used of whatever nature is placed in the ball through the door $b^2$, and water or any liquid or chemical substance used to moisten the plant-food—as, for instance, ammonia or any other diluted acid—may be added either by pouring the same into the ball or into the funnel, the stop-cock at such time being closed. The hollow ball and the glass will be adjusted to the position of the sun so that its rays may be focused on the copper plate, the heat of which may be thus varied more or less, as required. The liquid may be permitted to flow from the ball and funnel into the stem and escape therefrom into the ground when desired.

My apparatus is not limited, it will be understood, to the reception of any particular plant food or liquid, and any foods that are now used or being experimented upon by floriculturists or those interested in the development of plants through chemistry may be used, not only known substances, but any substances that it may be desired to experiment with.

Having described my invention, what I claim, and desire to secure by Letters Patent, is—

1. An apparatus of the class described, it comprising a funnel, a ball to contain plant-food and in communication with the funnel, a plate and a sun-glass, and means for sustaining the plate and sun-glass from the ball.

2. In apparatus of the class described, a funnel, a hollow perforated ball inclosed in the mouth of the funnel, a plate connected with the ball, and a sun-glass, and means to sustain the glass at a distance from the plate.

3. In apparatus of the class described, a funnel having a perforated shank, a stop-cock located between the upper end of the funnel and the perforations in the shank, a hollow perforated ball sustained in the funnel, said ball having a neck, and a metal plate secured to said neck.

4. In apparatus of the class described, a funnel having a perforated shank, a stop-cock located between the upper end of the funnel and the perforations in the shank, a hollow perforated ball sustained in the funnel, said ball having a neck, a metal plate secured to said neck, a sun-glass, and means to adjust the ball to place the sun-glass at the proper angle to directly receive the rays of the sun.

In testimony whereof I have signed my name to this specification in the presence of two subscribing witnesses.

ROBERT S. LAWRENCE.

Witnesses:
   GEO. W. GREGORY,
   LOUIS C. SMITH.